No. 889,402. PATENTED JUNE 2, 1908.
M. J. ROTHSCHILD.
CARRIAGE AND AUTOMOBILE BODY.
APPLICATION FILED SEPT. 16, 1907.
2 SHEETS—SHEET 1.
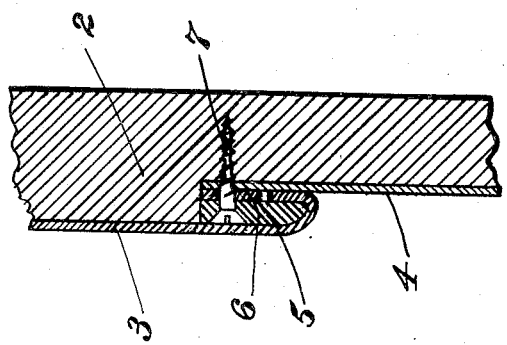
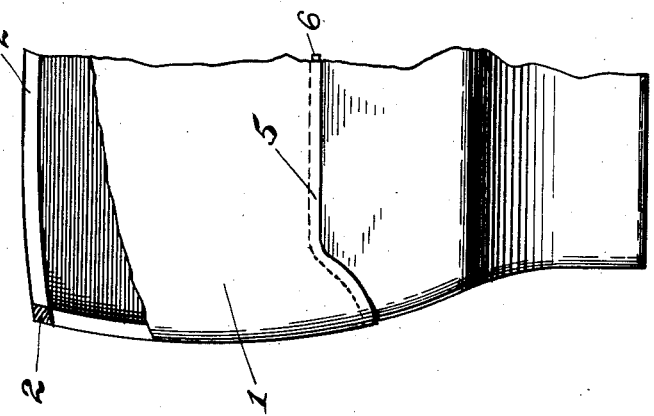
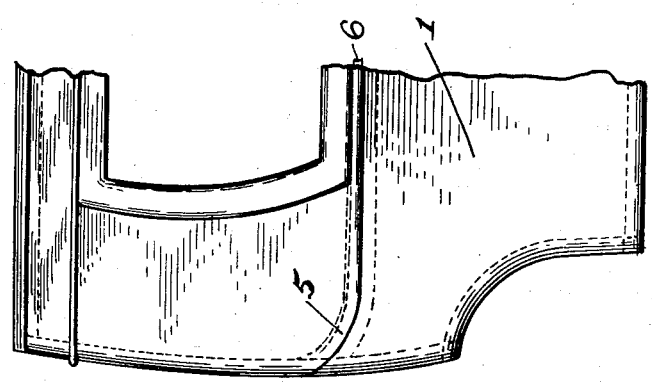

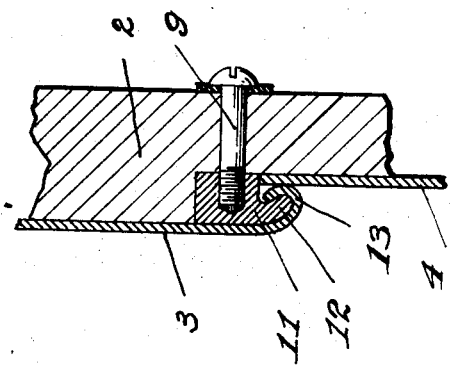
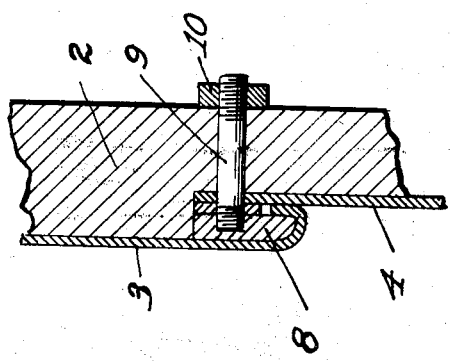

UNITED STATES PATENT OFFICE.

MAURICE J. ROTHSCHILD, OF NEW YORK, N. Y., ASSIGNOR TO ROTHSCHILD & COMPANY, OF NEW YORK, N. Y., A CORPORATION OF NEW YORK.

CARRIAGE AND AUTOMOBILE BODY.

No. 889,402.  Specification of Letters Patent.  Patented June 2, 1908.

Application filed September 16, 1907. Serial No. 393,001.

*To all whom it may concern:*

Be it known that I, MAURICE J. ROTHSCHILD, a citizen of the French Republic, and resident of the borough of Manhattan, in the city of New York, in the county of New York and State of New York, have invented certain new and useful Improvements in Carriage and Automobile Bodies, of which the following is a specification.

The present invention refers to improvements in carriage or automobile bodies and comprises more particularly means for assembling the body covering to the body frame.

As is well known in the manufacture of carriage bodies, the body comprises a frame of wood or any other similar material and a covering of leather, veneer or, more recently, of sheet metal, such as aluminum. The latter material is used on account of its lightness while, at the same time, it is very pliable and can easily be made to conform to the peculiar shape of a carriage body which shape practically excludes the use of any stiffer metal than aluminum for this purpose.

It is a well-known fact that sheet aluminum presents certain difficulties to the process of soldering and therefore, mechanical means, others than soldering, must be used for uniting abutting portions of aluminum.

The present invention has for one of its objects the provision of means for uniting sheet metals preferably aluminum, and attaching it to a carriage frame in a way which eliminates the metallic molding hitherto usually employed to cover the line of union between the two abutting sheets of metal. This result is brought about by the use of a bar, preferably of metal, which is connected to the body covering by permanently bending one edge of the latter entirely or partly around the bar, connecting the same to the off-set portion of the body frame, to which the other portion of the body covering has already been connected, and, if necessary, to secure the bar to the frame by suitable means.

The invention is illustrated in the accompanying drawing, forming part of the present application, in which Figure 1 is a side view of a carriage or automobile body; Fig. 2, a rear view of the same, in part broken away, and Figs. 3, 4 and 5, details of construction in fastening the body covering to the body frame.

The reference numeral 1 indicates the body covering which may be made of veneer or sheet metal, but preferably of sheet aluminum.

2 indicates the body frame, made of wood or of other suitable material.

3 in Figs. 3, 4 and 5, indicates the body covering of the upper part of a carriage body, while 4 refers to the similar covering of the lower part of the carriage body.

5 in Fig. 3, indicates a bar, preferably made of metal, having a substantially trapezoidal cross section and being bent in conformity to the shape of the body frame, as shown in Figs. 1 and 2. The lower edge of the covering of the upper part of the carriage body is secured by permanent flexion to the bar 5 and rests below the off-set portion of the body frame 2, as shown in Figs. 3, 4 and 5. In the form of construction, illustrated in Fig. 3, a strip of metal 6, of the same thickness as the sheet metal of the covering 3 of the upper carriage body, is secured to the frame 2 by means of screws 7, so that, when the covering of the upper body which has been made to conform to the shape of the upper body portion of the carriage or automobile, is placed in position on top of the lower body, the bar 6 is located below the shoulder of the off-set portion of the carriage frame and conforms in shape to the frame of the lower body. When now the body covering 3 is secured to the upper carriage frame by means of rivets or otherwise, it will be seen that the body covering of the upper part of the carriage body is held in place in relation to the lower body portion without the use of a separate molding as required in carriage bodies heretofore constructed.

In Fig. 4 a modification of this construction is shown in which the bar 8 is provided with screw holes, corresponding to similar holes in the carriage frame, so that, when the covering 3 with its bar 8 is placed in position, screw bolts 9 are screwed into the holes of the bar 8 and are secured to the frame 2 of the carriage body by means of nuts 10.

The modification illustrated in Fig. 5 possesses an additional advantage over the ones heretofore described which consists in a grooved bar 11, into which the edge 13 of the covering 3 is bent by permanent flexion around the shoulder 12, forming thereby a permanent connection between the bar 11 and the covering 3. The bar is secured to the body frame 2 in the manner already specified by means of screw bolts 9.

What is claimed as new and useful and desired to be secured by Letters Patent of the United States is:—

1. The combination with a frame or support, of a body covering or sheeting therefor, and a bar conforming to the shape of said frame and secured to said covering by permanent flexion of the edge of the latter.

2. The combination with a frame or support, of a body covering or sheeting therefor, a bar conforming to the shape of said frame and secured to said covering by permanent flexion of the edge of the latter, and means for securing said bar to said frame.

3. The combination with a covering or sheeting, of a bar having a groove and conforming to the shape of the edge of said covering, and secured to said covering by permanent flexion of the edge of said covering along the groove of said bar.

4. The combination with a body frame having an off set thereon, a covering secured to said frame below said off-set, a bar conforming in shape to said frame and located below said off-set, a covering or sheeting connected to said bar, and means for securing said bar to said frame.

In witness whereof the inventor has hereunto set his hand in the presence of two subscribing witnesses at New York, in the county of New York and State of New York.

MAURICE J. ROTHSCHILD.

In presence of—
S. T. BROWNE,
F. B. HOGINS.